United States Patent [19]

Riegel et al.

[11] 4,036,776

[45] July 19, 1977

[54] RECOVERY OF CHLORINE VALUES FROM A MELT OXIDATION GAS

[75] Inventors: Herbert D. Riegel, Maplewood; Harvey D. Schindler, Fairlawn; Vincent A. Strangio, Glenridge, all of N.J.

[73] Assignee: The Lummus Company, Bloomfield, N.J.

[21] Appl. No.: 656,769

[22] Filed: Feb. 10, 1976

[51] Int. Cl.² .............................................. C01B 9/02
[52] U.S. Cl. ................................. 252/187 R; 423/241; 423/463; 423/481; 423/488; 260/664; 423/493
[58] Field of Search ............... 423/472, 481, 486, 488, 423/491, 492, 493, 502, 240, 337, 241, 463; 252/187 R; 260/656 R, 659 A, 662 A, 664

[56] References Cited

U.S. PATENT DOCUMENTS

| 1,921,388 | 8/1933 | Heath et al. | 423/486 |
|---|---|---|---|
| 2,426,914 | 9/1947 | Allen | 423/488 |
| 3,233,978 | 2/1966 | Alkemade | 423/488 |
| 3,968,050 | 6/1976 | Riegel | 423/493 |
| 3,968,200 | 6/1976 | Tsao | 423/488 |

FOREIGN PATENT DOCUMENTS

| 681,079 | 2/1964 | Canada | 423/488 |

OTHER PUBLICATIONS

Gibbs "The Production of Hydrochloric Acid from Chlorine and Water", *Industrial and Engineering Chemistry*, vol. 12, No. 6 (AZO) pp. 538–541.

*Primary Examiner*—O. R. Vertiz
*Assistant Examiner*—Brian E. Hearn
*Attorney, Agent, or Firm*—Marn & Jangarathis

[57] ABSTRACT

A molten mixture containing the higher and lower valent forms of a multivalent metal chloride; in particular, cuprous and cupric chloride, is contacted with oxygen, and aqueous hydrogen chloride recycle, to recover the chlorine values by generation of the higher valent metal chloride and also effect oxidation of the melt by production of the oxychloride. The gas withdrawn from the oxidation contains hydrogen chloride, chlorine and water vapor, with the hydrogen chloride being separate from the gas as aqueous hydrogen chloride and recycle to the oxidation. The chlorine and water vapor in the gas are contacted with activated carbon to produce hydrogen chloride, which is separated as aqueous hydrogen chloride and recycled to the oxidation.

9 Claims, 1 Drawing Figure

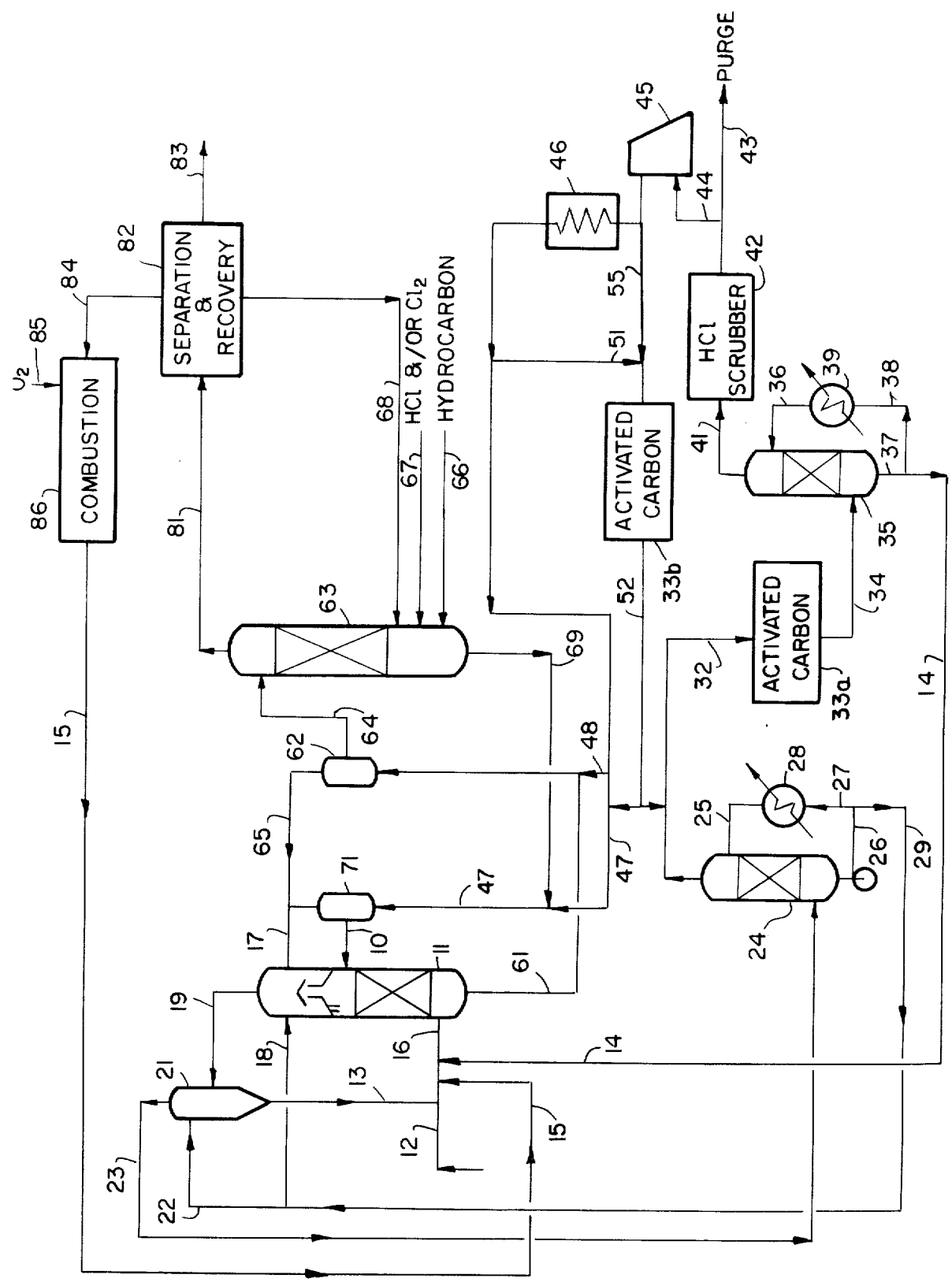

RECOVERY OF CHLORINE VALUES FROM A MELT OXIDATION GAS

This invention relates to the recovery of chlorine values, and more particularly, to the recovery of chlorine values from a gas withdrawn from a melt oxidation zone.

In a process for producing chlorinated hydrocarbons by the use of molten salts, a molten salt mixture containing a multivalent metal chloride in its higher and lower valence state is contacted with molecular oxygen to effect oxidation of the salt mixture. It has been found that the gas stream withdrawn from the melt oxidation zone contains chlorine, and the overall efficiencies of the process can be improved by effectively recovering chlorine from such gas.

Accordingly, an object of the invention is to recover chlorine values from a gas withdrawn form a melt oxidation zone.

Another object of the present invention is to provide for improved recovery of chlorine values in a process for producing chlorinated hydrocarbons.

These and other objects of the present invention will become more readily apparent from reading the following description thereof.

In accordance with the present invention, a molten salt mixture containing a multivalent metal chloride in its higher and lower valence state is contacted in a reaction zone with molecular oxygen, recycled aqueous hydrogen chloride, and optionally, a gas containing chlorine, hydrogen chloride or mixtures thereof, to effect oxidation of the salt and recovery of chlorine values form the aqueous hydrogen chloride (and also those present in the gas feed) by production of the higher valent metal chloride. The gas withdrawn from the reaction zone contains chlorine (in amounts up to the salt chlorine vapor pressure at the oxidation conditions), and the chlorine content of the gas is converted to gaseous hydrogen chloride by contact with water vapor (steam) and activated carbon. The hydrogen chloride is then recovered, as aqueous hydrogen chloride, and recycled (with or without concentration thereof) to the reaction zone to recover the chlorine values thereof.

In accordance with a preferred embodiment, a gas stream containing chlorine, hydrogen chloride or mixtures thereof, is also introduced, as feed, into the oxidation reaction zone to recover the chlorine values thereof. The gas generally includes both chlorine and hydrogen chloride, and is preferably a chlorinated hydrocarbon combustion gas, generated by the burning of waste chlorinated hydrocarbons; and in particular, a combustion gas generated in a process for producing chlorinated hydrocarbons.

The salt mixture generally contains the higher and lower valent chlorides of either manganese, iron, copper, cobalt, chromium, or mixtures thereof, preferably the higher and lower valent chlorides of copper. The molten mixture also includes a metal salt melting point depressant which is non-volatile and resistant to the action of oxygen, at the process conditions, in order to maintain the multivalent metal chloride in the form of a melt. The melting point depressant is generally either an alkali metal chloride or a heavy metal chloride; i.e., heavier than copper, of Groups I, II, III and IV of the Periodic Table. The preferred melting point depressant is potassium chloride. A preferred molten salt mixture contains from about 20% to about 40%, by weight, potassium chloride, with the remainder being copper chlorides.

The oxidation reaction zone is generally operated at a temperature of from 600° F to 900° F, preferably a temperature of from 750° F to 870° F, and a pressure of from 1 to 20 atmospheres. The contacting of the feed and melt is generally effected in a counter-current fashion, although co-current operation is also possible. The oxygen which is added to the oxidation reaction zone can be in a quantity corresponding to that required to convert the hydrogen chloride values to the higher valent metal chloride, and is preferably introduced in excess of such amounts in order to provide for net production of oxychloride in the melt, whereby in the oxidation reaction zone, the molten salt mixture is enriched in the higher valent metal chloride content thereof, and in addition, oxychloride is generated.

The gas recovered from the oxidation reaction zone which is to be contacted with activated carbon, includes chlorine, as well as water vapor, some hydrogen chloride and inerts. The contacting with activated carbon is generally effected at a temperature of from 100° F to 250° F, and preferably a temperature of from 115° F to 215° F. The contacting pressure is generally from 15 to 100 psia and preferably from 25 to 70 psia. It has been found that the use of such conditions provides the added advantage of reduced carbon oxidation.

The activated carbon is preferably one with a low ash content; e.g., less than 1% ash, to permit consumption of the carbon without leaving an ash residue which could lead to contamination of the molten salt through leaching by recovered hydrochloric acid. The activated carbon preferably has a high surface area; for example 500 m$^2$/gm or greater.

Although the present invention is not to be limited by any theoretical reasoning, it is believed that chlorine is converted to hydrogen chloride by two different mechanisms. In one, chlorine and water vapor react directly with carbon as follows:

(1) $Cl_2 + H_2O + \tfrac{1}{2}C \rightleftarrows 2 HCl + \tfrac{1}{2} CO_2$

In addition, chlorine and water vapor are adsorbed by the carbon and all or a portion of the adsorbed chlorine is converted to hydrogen chloride as follows:

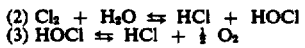

(2) $Cl_2 + H_2O \rightleftarrows HCl + HOCl$
(3) $HOCl \rightleftarrows HCl + \tfrac{1}{2} O_2$ After a period of operation, the bed no longer effectively converts chlorine to hydrogen chloride, as evidenced by chlorine breakthrough, as a result of carbon consumption (Equation (1)). At such a time, the bed is taken off-stream for replacement of the carbon, and another bed is placed on stream. The bed is initially purged of chlorine and hydrogen chloride to permit safe opening of the vessel by operators and such purging can be effected by use of an inert gas. In general, such purging is effected at temperatures of from 200° to 350° F; however, such temperature conditions are illustrative only in that purging can be effected at other temperatures. The purge gas, subsequent to contact with the activated carbon contains chlorine and/or hydrogen chloride, generally both chlorine and hydrogen chloride, desorbed from the bed. The purge gas is preferably introduced into the activated carbon bed which is on-stream to recover the chlorine values therefrom. After replacement of the carbon, the replenished bed is heated to reaction conditions, preferably by contact with an inert gas at the appropriate temperature.

The invention will be further described with respect to an embodiment thereof illustrated in the accompanying drawing wherein:

The drawing is a simplified schematic flow diagram of an embodiment of the present invention.

It is to be understood, however, that the scope of the present invention is not limited to such an embodiment. The particular embodiment will be described with respect to a process for producing chlorinated methanes; however, the scope of the present invention, as hereinafter noted, is not limited to such chlorinated methane production.

Referring to the drawing, a molten chloride salt, such as a mixture of potassium chloride, cupric chloride and cuprous chloride, in line 10 is introduced into the top of an oxidation vessel 11, maintained at temperatures and pressures, as hereinabove described. A compressed molecular oxygen containing gas, such as air in line 12 an aqueous solution of hydrogen chloride, in lines 13 and 14, obtained as hereinafter described, and a by-product combustion effluent, in line 15 obtained as hereinafter described, and comprising chlorine, hydrogen chloride, as well as carbon oxides, water vapor, nitrogen and perhaps unreacted oxygen, are combined in line 16 and introduced into reactor 11. It is to be understood that the feed stream introduction may be effected otherwise than as particularly described.

As a result of the countercurrent contact between the feed introduced through line 16 and the descending molten salt mixture, introduced through line 10, the salt is oxidized to produce copper oxychloride, and the hydrogen chloride and chlorine introduced as aqueous hydrogen chloride, are selectively reacted with the molten salt to produce cupric chloride. In addition, the water introduced with the aqueous hydrogen chloride is vaporized. Furthermore, as hereinabove described, the amount of oxygen present in the gas introduced through line 12 is in an amount in excess of that required to react with the hydrogen chloride, whereby there is net production of copper oxychloride.

An effluent gas, including water vapor, nitrogen, carbon oxides, chlorine and hydrogen chloride rises into the top of vessel 11 wherein the gas is combined with lift gas, as hereinafter described, introduced through line 17. The combined gas is directly contacted in the top of vessel 11 with a spray of aqueous hydrogen chloride quench liquid introduced through line 18 to cool the combined gas and eliminate any vaporized and entrained salts therefrom. The effluent gas is cooled to a temperature at which the molten salt is still in the form of a melt to permit the molten salt to flow back into the reactor 11.

The cooled gaseous stream withdrawn from reactor 11 through line 19 is introduced into quench vessel 21, wherein the gaseous stream is directly contacted with an aqueous hydrogen chloride stream introduced through line 22. The quenching in vessel 21 is effected in a manner such that the aqueous hydrogen chloride quench liquid introduced through line 22 is partially vaporized which produces a remaining aqueous hydrogen chloride quench liquid having a higher concentration of hydrogen chloride. The quenching in vessel 21 also functions to separate any remaining entrained salt from the gaseous effluent. In accordance with a preferred embodiment, quenching in vessel 21 is effected in a manner to cool the effluent to a temperature of 200° -14 250° F.

The remaining liquid aqueous hydrogen chloride quench liquid, containing any remaining salt, is withdrawn from vessel 21 through line 13 and introduced, as recycle, into reactor 11.

The effluent gas, now also containing vaporized quench liquid, withdrawn from vessel 21 through line 23, is introduced into a direct contact quench tower 24 of a type known in the art, wherein the gas is cooled by direct contact with aqueous hyrdrogen chloride quench liquid introduced through line 25. The quenching in tower 24 is controlled in a manner such that not all the hydrogen chloride present in the off gas is recovered therefrom in that such complete recovery will be accompanied by an unacceptable corresponding amount of water condensation. In accordance with a preferred embodiment of the present invention, condensation is preferably controlled to condense an aqueous hyodrogen chloride solution having a hydrogen chloride concentration of 8% to 20%, preferably from 10% to 18%, all by weight. In general, such a result can be achieved by effecting cooling of the gas introduced into tower 24 to a temperature of from 120° F to 250° F.

An aqueous hydrogen chloride solution is withdrawn from tower 24 through line 26 and a first portion thereof passed through line 27 and cooler 28 for introduction into the quench tower through line 25 to meet the cooling requirements therefor. A second portion of the aqueous hydrogen chloride is passed through line 29 for meeting the quenching requirements of the reactor 11 through line 18 and the requirements of vessel 21 through line 22.

The gas withdrawn from tower 24 through line 32, contains inerts, water vapor, some hydrogen chloride and chlorine, and is introduced into reactor 33a of a pair of reactors 33a and b, each containing a bed of activated carbon. For purposes of illustration, reactor 33a is on-stream and reactor 33b has been recently taken off-stream for replenishment of activated carbon. As a result of the contact between the gas introduced through line 32 and the activated carbon in reactor 33a, the chlorine is converted to hydrogen chloride. The gas withdrawn from reactor 33a, through line 34, is essentially free of chlorine, and contains increased amounts of hydrogen chloride, water vapor, nitrogen and carbon oxides. The gas may also include some oxygen (Equation 3). The gas in line 34 is introduced into a direct contact quench tower 35, of a type known in the art, wherein the gas is cooled by direct contact with aqueous hydrogen chloride quench liquid introduced through line 36. The quenching in tower 35 is controlled in a manner such that not all of the hydrogen chloride present in the gas is recovered therefrom, as described with reference to the operation of quench tower 24. In accordance with the invention, condensation is preferably controlled to provide a condensed aqueous hydrogen chloride solution having a hydrogen chloride concentration from 8% to 20%, preferably from 10% to 18%, all by weight. In general, such a result can be achieved by effecting cooling of the gas introduced into tower 35 to a temperature of from 100° F to 250° F.

An aqueous hydrogen chloride solution is withdrawn from tower 35 through line 37, and a first portion thereof passed through line 38, including cooler 39, for introduction into the quench tower through 36. A second portion of the aqueous hydrogen chloride is passed through line 14 for introduction into the oxidation vessel 11 to recover the chlorine values thereof. The aqueous hydrogen chloride in line 14 can be concentrated; e.g., by stripping of water, prior to introduction into oxidation vessel 11.

The gas withdrawn from tower 35 through line 41 is caustic and water washed in zone 42 to remove remaining hydrogen chloride, and a portion thereof released to the atmosphere through line 43. The remaining portion of the gas in line 44 is compressed in compressor 45, and the temperature thereof regulated in heat exchanger 46, prior to passage through lines 47 and 48 for use as a lift gas for transporting molten salt, as hereinafter described.

A portion of the compressed lift gas, in line 51 or line 55 (depending on temperature conditions) is passed through reactor 33b, containing activated carbon previously employed for removing chlorine from the gas in line 32, in order to strip chlorine and hydrogen chloride therefrom, priot to replenishing the activated carbon. The lift gas, withdrawn from reactor 33b, in line 52, containing components desorbed from the activated carbon bed; in particular, chlorine and/or hydrogen chloride, is combined with the gas in line 32, with the chlorine values ultimately being recovered therefrom, as hereinabove described. Alternatively, the lift gas containing chlorine and/or hydrogen chloride can be combined with lift gas in line 47 for ultimate reusing of chlorine values. After replenishment of the activated carbon, bed 33b can be heated to operation conditions by a portion of the lift gas in line 51 or 55.

Referring back to the oxidation vessel 11, a molten salt, now containing copper oxychloride, and enriched in the cupric chloride content thereof, is withdrawn from the bottom of vessel 11 through line 61 and lifted by the lift gas in line 48 into a separation vessel 62, positioned adjacent to the top of chlorination vessel 63. In separator 62, the molten salt is separated from the lift gas, with the molten salt being introduced into the top of chlorination vessel 63 through line 64. The lift gas is withdrawn from vessel 62 through line 65, and combined with lift gas used for transporting salt to the oxidation reactor 11, for introduction into the quenching portion of vessel 11 through line 17, to thereby separate any entrained and vaporized salt therefrom.

Fresh feed methane in line 66, fresh feed hydrogen chloride and/or chlorine in line 67 and recycle components in line 68 are introduced into the bottom of reactor 63 wherein they are contacted with the descending molten salt to effect chlorination of the methane and recycle components.

Molten salt withdrawn from reactor 63 through line 69 is lifted by lift gas in line 47 into a separation vessel 71, positioned adjacent to the top of reactor 11. In separator 71, the molten salt is separated from lift gas, and introduced through line 10 into vessel 11. Lift gas is withdrawn from separator 71 through line 72 and combined with the lift gas in line 65 for introduction, through line 17 into the top of the quenching section of the vessel 11.

A chlorination effluent is withdrawn from reactor 63 through line 81 and introduced into a separation and recovery section, schematically indicated as 82. In separation and recovery section 82, recycle components are recovered and recycled to reactor 63 through line 68. Chlorinated methane reaction product is recovered from separation section 82 through line 83.

Chlorinated hydrocarbons which are not recovered as reaction product, and not suitable, as recycle, for the production of chlorinated methanes, are withdrawn from the separation and recovery section 82, through line 84, and introduced along with molecular oxygen, in line 85, into a combustion zone 86 wherein the chlorinated hydrocarbons are burned to recover the chlorine values thereof. A combustion effluent, including hydrogen chloride, chlorine, carbon oxides, water vapor and nitrogen, and optionally oxygen, is withdrawn from combustion chamber 86 through line 15 for introduction into the reactor 11, as hereinabove described.

It should be readily apparent that the overall scope of the invention is not to be limited by the hereinabove described embodiment thereof illustrated in the accompanying drawing. Thus, numerous modifications of the embodiment may be effected within the spirit and scope of the present invention. For example, the hydrogen chloride present in the effluent from reactor 11 can be recovered in a manner other than as particularly described; i.e., by indirect cooling, instead of direct quenching. Similarly, the partial vaporizing quench step could be eliminated from the hydrogen chloride recovery.

As a further modification, the overall invention is also applicable to a process wherein a combustion gas is not introduced into the oxidation reactor 11. Similarly, the gas introduced into the reactor 11, if any, could contain either hydrogen chloride or chlorine, rather than a mixture thereof.

As another modification, the activated carbon could be purged by use of an extraneous stripping gas.

As yet a further modification, hydrogen chloride could be recovered from the effluent withdrawn from the activated carbon reactor other than as described; e.g., by indirect cooling or partial condensation.

As still another modification, the aqueous hydrogen chloride recovered in the quench tower 35 could be combined with the aqueous hydrogen chloride in line 22 for introduction into the quench vessel 21.

The overall described embodiment is also applicable to the production of $C_2$ chlorinated hydrocarbons, by the use of molten salts. In the production of a chlorinated $C_2$ hydrocarbon, such as vinyl chloride, trichloroethylene, perchloroethylene, ethane and/or ethylene is employed as fresh feed, and in addition, the chlorination reactor is either provided with a separate dehydrochlorination section or a separate dehydrochlorination vessel. Similarly, the process of the present invention is also applicable to the production of other chlorinated aliphatic hydrocarbons, such as chlorinated $C_2$ hydrocarbons, and to chlorinated aromatic hydrocarbons, such as chlorinated benzenes.

These and other modifications should be apparent to those skilled in the art from the teachings herein.

The invention will be further described with respect to the following example which further illustrates the invention. It is to be understood, however, that the scope of the invention is not to be limited thereby.

EXAMPLE

The activated carbon reactor 33a is operated at a pressure of 46 psig, an inlet temperature of 175° F and an outlet temperature of 180° F.

The quench tower 35 is operated at an overhead temperature (line 41) of 155° F, a bottoms temperature (line 37) of 165° F and a quench inlet (line 36) temperature of 145° F.

The composition of the streams are as follows:

|  | Line 32 | | Line 34 | | Line 41 | | Line 14 | |
| --- | --- | --- | --- | --- | --- | --- | --- | --- |
|  | lb mole/hr | lb/hr | lb mole/hr | lb/hr | lb mole/hr | lb/hr | lb mole/hr | lb/hr |
| $Cl_2$ | 4 | 284 | trace | trace | trace | trace | — | — |
| N | 2419.1 | 67735 | 2419.1 | 67735 | 2419.1 | 67735 | — | — |
| $O_2$ | 119.7 | 3830 | 120.9 | 3868 | 120.9 | 3868 | — | — |
| $CO_2$ | 26.7 | 1175 | 27.5 | 1210 | 27.5 | 1210 | — | — |
| HCl | 0.5 | 18 | 8.5 | 310 | 0.3 | 11 | 8.2 | 299 |
| $H_2O$ | 287.8 | 5186 | 283.8 | 5114 | 148.8 | 2681 | 135. | 2433 |
|  | 2857.8 | 78228 | 2859.8 | 78237 | 2716.6 | 75505 | 143.2 | 2732 |

The present invention is particularly advantageous in that essentially all chlorine values are recovered. In particular, the chlorine values which would normally be lost in the gas withdrawn from a molten salt oxidation reactor are effectively recovered and utilized in the chlorination process. In addition, the gases purged to the atmosphere will meet air pollution requirements; e.g., in some cases, 30 ppm chlorine.

Numerous modifications and variations of the present invention are possible in light of the above teachings and, therefore, within the scope of the appended claims, the invention may be practiced otherwise than as particularly described.

What is claimed is:

1. In a process for oxidizing in an oxidation reaction zone a molten salt mixture containing a multivalent metal chloride in its higher and lower valence state by contacting the molten salt mixture with gaseous molecular oxygen and aqueous hydrogen chloride at a temperature of from 600° F to 900° F to produce an oxidized melt and recover chlorine values by enriching the higher valent multivalent metal chloride content of the molten salt mixture and recovering the molten salt from the oxidation reaction zone, the improvement comprising:
   withdrawing from the oxidation reaction zone an effluent gas containing water vapor and chlorine, said chlorine being present in an amount up to the chlorine vapor pressure of the molten salt mixture;
   cooling the effluent gas;
   contacting the effluent gas in a chlorine separation zone with activated carbon to convert chlorine to hyrogen chloride, said contacting being effected at a temperature of from 100° F to 250° F and a pressure of from 15 to 100 psia;
   Withdrawing from the chlorine separation zone a gas essentially free of chlorine and containing water vapor and hydrogen chloride produced from the chlorine;
   recovering aqueous hydrogen chloride from said gas; and
   introducing recovered aqueous hydrogen chloride into said oxidation reaction zone.

2. The process of claim 1 wherein the oxidation effluent gas withdrawn from the oxidation reaction zone further contains hydrogen chloride, said hydrogen chloride being recovered as aqueous hydrogen chloride and recycled to the oxidation reaction zone.

3. The process of claim 2 wherein a gas containing a member selected from the group consisting of chlorine, hydrogen chloride and mixtures thereof is also introduced into the oxidation reaction zone.

4. The process of claim 3 wherein the multivalent metal chloride is selected from the group consisting of the chlorides of manganese, iron, chromium, cobalt, copper and mixtures thereof.

5. The process of claim 1 wherein the molten mixture contains cuprous and cupric chloride.

6. The process of claim 5 wherein the chlorine separation zone includes first and second reactors, said contacting with activated carbon being effected in the first reactor, said second reactor including activated carbon previously employed for separation of chlorine and further comprising: contacting the activated carbon in the second reactor with a portion of the gas remaining subsequent to recovery of aqueous hydrogen chloride to effect purging of the activated carbon by desorbing adsorbed chlorine and hydrogen chloride.

7. The process of claim 5 wherein the gas, containing desorbed chlorine and hydrogen chloride is combined with the effluent gas withdrawn from the oxidation reaction zone.

8. The process of claim 5 wherein aqueous hydrogen chloride recovered from the gas withdrawn from the chlorine separation zone is concentrated prior to recyle to the oxidation reaction zone.

9. The process of claim 5 wherein the activated carbon has an ash content of less than 1% and a surface area of at least 500 m²/gm.

* * * * *